(12) United States Patent
Li et al.

(10) Patent No.: US 10,325,603 B2
(45) Date of Patent: Jun. 18, 2019

(54) VOICEPRINT AUTHENTICATION METHOD AND APPARATUS

(71) Applicant: BAIDU ONLINE NETWORK TECHNOLOGY (BEIJING) CO., LTD., Beijing (CN)

(72) Inventors: Chao Li, Beijing (CN); Yong Guan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/757,928

(22) Filed: Dec. 23, 2015

(65) Prior Publication Data

US 2016/0372121 A1 Dec. 22, 2016

(30) Foreign Application Priority Data

Jun. 17, 2015 (CN) .......................... 2015 1 0337291

(51) Int. Cl.
| | | |
|---|---|---|
| *G10L 15/00* | (2013.01) | |
| *G10L 21/00* | (2013.01) | |
| *G10L 25/00* | (2013.01) | |
| *G10L 17/00* | (2013.01) | |
| *G10L 15/04* | (2013.01) | |
| *G10L 15/06* | (2013.01) | |
| *G10L 15/26* | (2006.01) | |

(Continued)

(52) U.S. Cl.
CPC .............. *G10L 17/24* (2013.01); *G10L 17/04* (2013.01); *G10L 17/08* (2013.01); *G10L 17/14* (2013.01)

(58) Field of Classification Search
CPC ....... G10L 15/265; G10L 15/22; G10L 15/20; G10L 15/02; G10L 13/08; H05K 999/99
See application file for complete search history.

(56) References Cited

U.S. PATENT DOCUMENTS 5,852,801 A * 12/1998 Hon ......................... G10L 15/22
704/243
5,950,160 A * 9/1999 Rozak ...................... G10L 15/22
704/240
(Continued)

FOREIGN PATENT DOCUMENTS

CN 1808567 A 7/2006
CN 105096121 A 11/2015
(Continued)

OTHER PUBLICATIONS

European Patent Application No. 15201114, Communication pursuant to Article 94(3) EPC dated Jun. 12, 2018, 5 pp.
(Continued)

*Primary Examiner* — Anne L Thomas-Homescu
(74) *Attorney, Agent, or Firm* — Lathrop Gage LLP

(57) ABSTRACT

The present disclosure provides a voiceprint authentication method and a voiceprint authentication apparatus. The method includes: displaying a tip text to a user, the tip text being a combination of a preregistered phrase; obtaining a speech of the tip text read by the user; obtaining a preestablished registration model and determining a result of a voiceprint authentication according to the speech of the tip text and the pre-established registration model, if the speech of the tip text corresponds to the tip text.

11 Claims, 5 Drawing Sheets

(51) Int. Cl.

| | | |
|---|---|---|
| G10L 13/00 | (2006.01) | |
| G10L 13/08 | (2013.01) | |
| G06F 7/04 | (2006.01) | |
| G06F 15/16 | (2006.01) | |
| G06F 17/30 | (2006.01) | |
| G10L 17/24 | (2013.01) | |
| G10L 17/04 | (2013.01) | |
| G10L 17/08 | (2013.01) | |
| G10L 17/14 | (2013.01) | |

(56) References Cited

U.S. PATENT DOCUMENTS

| | | | | |
|---|---|---|---|---|
| 8,527,773 | B1* | 9/2013 | Metzger | G06F 21/31 380/255 |
| 8,694,315 | B1* | 4/2014 | Sheets | G06Q 20/40145 704/246 |
| 8,744,856 | B1* | 6/2014 | Ravishankar | G09B 19/04 434/185 |
| 8,775,165 | B1* | 7/2014 | Oikawa | G06F 17/241 704/10 |
| 9,202,076 | B1* | 12/2015 | Chazin | G06F 21/6218 |
| 9,454,656 | B2* | 9/2016 | Oberheide | G06F 21/32 |
| 2002/0046033 | A1* | 4/2002 | Ono | G10L 15/063 704/270 |
| 2002/0094512 | A1* | 7/2002 | Bhogal | G10L 15/26 434/169 |
| 2002/0152070 | A1* | 10/2002 | Oda | G07C 9/00158 704/246 |
| 2003/0163321 | A1* | 8/2003 | Mault | A61B 5/044 704/270 |
| 2004/0243412 | A1* | 12/2004 | Gupta | G10L 15/07 704/254 |
| 2005/0039057 | A1* | 2/2005 | Bagga | G06F 21/40 726/19 |
| 2005/0132235 | A1* | 6/2005 | Teunen | G06F 21/32 726/19 |
| 2005/0171851 | A1* | 8/2005 | Applebaum | G06F 21/32 705/18 |
| 2007/0055517 | A1 | 3/2007 | Spector | |
| 2007/0162761 | A1* | 7/2007 | Davis | G06Q 10/00 713/182 |
| 2009/0313020 | A1* | 12/2009 | Koivunen | G06F 3/04847 704/260 |
| 2010/0106503 | A1 | 4/2010 | Farrell et al. | |
| 2010/0131273 | A1 | 5/2010 | Aley-Raz et al. | |
| 2010/0217600 | A1* | 8/2010 | Lobzakov | G10L 13/00 704/260 |
| 2012/0253809 | A1 | 10/2012 | Thomas et al. | |
| 2013/0132091 | A1 | 5/2013 | Skerpac | |
| 2013/0218566 | A1* | 8/2013 | Qian | G10L 13/033 704/260 |
| 2013/0227678 | A1* | 8/2013 | Kang | G06F 21/32 726/19 |
| 2013/0231918 | A1* | 9/2013 | Roloff | G10L 15/26 704/9 |
| 2014/0136205 | A1* | 5/2014 | Jang | H04L 12/282 704/249 |
| 2014/0278435 | A1* | 9/2014 | Ganong, III | G10L 15/22 704/275 |
| 2014/0359736 | A1 | 12/2014 | Harty et al. | |
| 2015/0039311 | A1* | 2/2015 | Clark | G10L 15/063 704/244 |
| 2015/0046990 | A1* | 2/2015 | Oberheide | G06F 21/32 726/6 |
| 2015/0235017 | A1* | 8/2015 | Oberheide | G06F 21/32 726/6 |
| 2016/0035349 | A1* | 2/2016 | Jung | G10L 15/22 704/235 |
| 2016/0057261 | A1* | 2/2016 | Bang | H04M 1/271 455/563 |
| 2016/0073225 | A1* | 3/2016 | Ganesalingam | H04W 4/02 455/456.1 |
| 2016/0078864 | A1* | 3/2016 | Palanisamy | G10L 15/08 704/235 |
| 2016/0232891 | A1* | 8/2016 | Pecorari | G10L 15/063 |
| 2016/0267128 | A1* | 9/2016 | Dumoulin | G06F 17/30401 |

FOREIGN PATENT DOCUMENTS

| | | | |
|---|---|---|---|
| EP | 3109858 | A1 | 12/2016 |
| JP | H0884190 | A | 3/1996 |
| JP | 2002304379 | A | 10/2002 |
| JP | 02002311992 | A * | 10/2002 |
| JP | 2004062076 | A | 2/2004 |
| JP | 2004287674 | A | 10/2004 |
| JP | 2005128307 | A | 5/2005 |
| JP | 2007052496 | A | 3/2007 |

OTHER PUBLICATIONS

European Patent Application No. 15201114, Communication pursuant to Article 94(3) EPC dated Oct. 23, 2017, 5 pp.
Japanese Patent Application No. 2015-218244, Office Action dated Sep. 5, 2017, 2 pages.
Japanese Patent Application No. 2015-218244, English translation of Office Action dated Sep. 5, 2017, 3 pages.
European Patent Application No. 15201114.4, Partial European Search Report dated Mar. 23, 2016, 7 pages.
European Patent Application No. 15201114.4, Extended Search and Opinion dated Jul. 8, 2016, 13 pages.
Korean Patent Application No. 20150174090, Office Action dated Mar. 3, 2017, 4 pages.
Korean Patent Application No. 20150174090, English translation of Office Action dated Mar. 3, 2017, 2 pages.
Chinese Patent Application No. 201510337291.8, Office Action dated Jul. 12, 2016, 7 pages.
Chinese Patent Application No. 201510337291.8, English translation of Office Action dated Jul. 12, 2016, 8 pages.

* cited by examiner

VOICEPRINT AUTHENTICATION METHOD AND APPARATUS

CROSS-REFERENCE TO RELATED APPLICATION

This application claims priority to and benefits of Chinese Patent Application Serial No. 201510337291.8, filed with State Intellectual Property Office on Jun. 17, 2015, the entire content of which is incorporated herein by reference.

FIELD

The present disclosure generally relates to the field of authentication technology, and more particularly, to a voiceprint authentication method and a voiceprint authentication apparatus.

BACKGROUND

The current voiceprint authentication technology may be related to the text or unrelated to the text. The voiceprint authentication technology unrelated to the text does not distinguish the content said by the user, and the voiceprint authentication technology related to the text requires the content said by the user being consistent with that said by the user during the registration. Each of these two technologies has both advantages and disadvantages: with the voiceprint authentication technology unrelated to the text, the application thereof is flexible, however the user is required to speak for a long time to cover the big sample space, because the content said by the user is not restricted; and with the authentication technology related to the text, although the user only needs to speak for a short time, the content said by the user must be consistent with that said by the user during the registration, and the fraud with sound recording cannot be avoided.

SUMMARY

The present disclosure aims to solve at least one of the problems existing in the related art to at least some extent.

Accordingly, an objective of the present disclosure is to provide a voiceprint authentication method. With the method, the user needs not to speak for a long time during the authentication and the content of speeches is variable, such that the fraud with sound recording may be avoided.

Another objective of the present disclosure is to provide a voiceprint authentication device.

In order to achieve above objectives, embodiments of a first aspect of the present disclosure provide a voiceprint authentication method. The method includes: displaying a tip text to a user, in which the tip text is a combination of a preregistered phrase; obtaining a speech of the tip text read by the user; obtaining a pre-established registration model and determining a result of an voiceprint authentication according to the speech of the tip text and the pre-established registration model, if the speech of the tip text corresponds to the tip text.

With the voiceprint authentication method according to embodiments of the present disclosure, the voiceprint authentication based on the limited text may be realized by comparing the speech and the registration model. Since the registration model is adopted, this method is equivalent to the voiceprint authentication technology unrelated to the text, thus the user needs not to speak for a long time during the authentication. In addition, since the tip text is the combination of the preregistered phase, this method is equivalent to the way of adopting the fixed registered phrase in the voiceprint authentication technology unrelated to the text, such that the content of speeches may be variable, and the fraud with sound recording may be avoided.

In order to achieve above objectives, embodiments of a second aspect of the present disclosure provide a voiceprint authentication apparatus. The apparatus includes: a first displaying module, configured to display a tip text to a user, in which the tip text is a combination of a preregistered phrase; a first obtaining module, configured to obtain a speech of the tip text read by the user; and an authenticating module, configured to obtain a pre-established registration model and determine a result of a voiceprint authentication according to the speech of the tip text and the pre-established registration model, if the speech of the tip text corresponds to the tip text.

With the voiceprint authentication apparatus according to embodiments of the present disclosure, the voiceprint authentication based on the limited text may be realized by comparing the speech and the registration model. Since the registration model is adopted, this authentication method in the apparatus is equivalent to the voiceprint authentication technology unrelated to the text, thus the user needs not to speak for a long time during the authentication. In addition, since the tip text is the combination of the preregistered phase, this method is equivalent to the way of adopting the fixed registered phrase in the voiceprint authentication technology unrelated to the text, such that the content of speeches may be variable, and the fraud with sound recording may be avoided.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
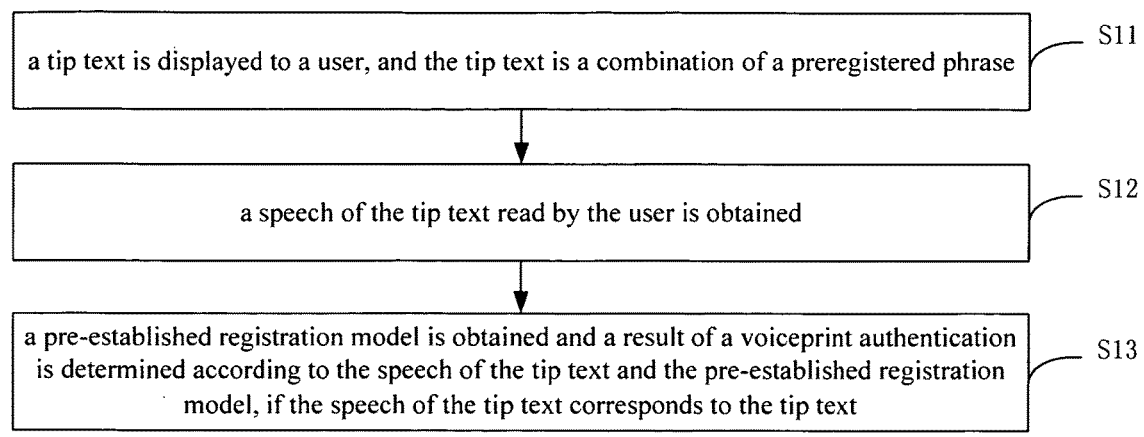
FIG. 1 is a flow chart showing a voiceprint authentication method according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. In contrast, the present disclosure may include alternatives, modifications and equivalents within the spirit and scope of the appended claims.

FIG. 1 is a flow chart showing a voiceprint authentication method according to an embodiment of the present disclosure. As shown in FIG. 1, this voiceprint authentication method may include the following steps.

In step S11, a tip text is displayed to a user, and the tip text is a combination of a preregistered phrase.

If the user needs to conduct a voiceprint authentication, a user identification (i.e. a user ID, such as, a phone number, a login account, etc.) may be obtained firstly. Then, the registered phrase corresponding to the user identification may be searched for in the registration information previously established.

For example, if the user is a first user, and the phrases registered by the first user in the registration information include A, B, C, etc., phrases selected from A, B, C may be combined to form the tip text.

When forming the tip text by combining the phrases selected from the registered phrases, the selection algorithm and the number of phrases selected may be configurable.

Alternatively, the preregistered phrase includes a plurality of phrases, and before displaying the tip text, the method further includes:

selecting at least one phrase from the plurality of phrases and combining the at least one phase to form the tip text.

For example, the selection algorithm may be randomly selection algorithm, and two phrases are selected. It is assumed that the preregistered phrases include: "we", "really", "angry", "Bull", "at the diner" and "does/do not wash hands", then two phrases selected randomly from these six phrases may be combined to form the tip text, for example, the tip text may be "angry Bull", "does/do wash hands really", etc.

It should be understood that, the number of phrases selected for forming the tip text is not limited herein, which may be one or more. In addition, the number of the tip texts is also not limited herein, which may be one or more. Take an authentication procedure of a tip text as an example in subsequent embodiments. It should be understood that, if the tip text includes a plurality of tip texts, the authentication procedure of the plurality of tip texts may be accomplished according to the authentication procedure of a tip text, and if each of the plurality of tip texts is authenticated successfully, it is determined that the voiceprint authentication is successful, otherwise it is determined that the voiceprint authentication is failed.

In step S12, a speech of the tip text read by the user is obtained.

After displaying the tip text to the user, the user may read it.

The authentication apparatus for performing this method may be provided with a speech obtaining module, thus the speech read by the user may be obtained. For example, the authentication apparatus may include a foreground module and a background module. The foreground module may be disposed in the user's device, and the user's device also includes the speech obtaining module to obtain the speech read by the user.

In step S13, a pre-established registration model is obtained and a result of a voiceprint authentication is determined according to the speech of the tip text and the pre-established registration model, if the speech of the tip text corresponds to the tip text.

Figure 2:
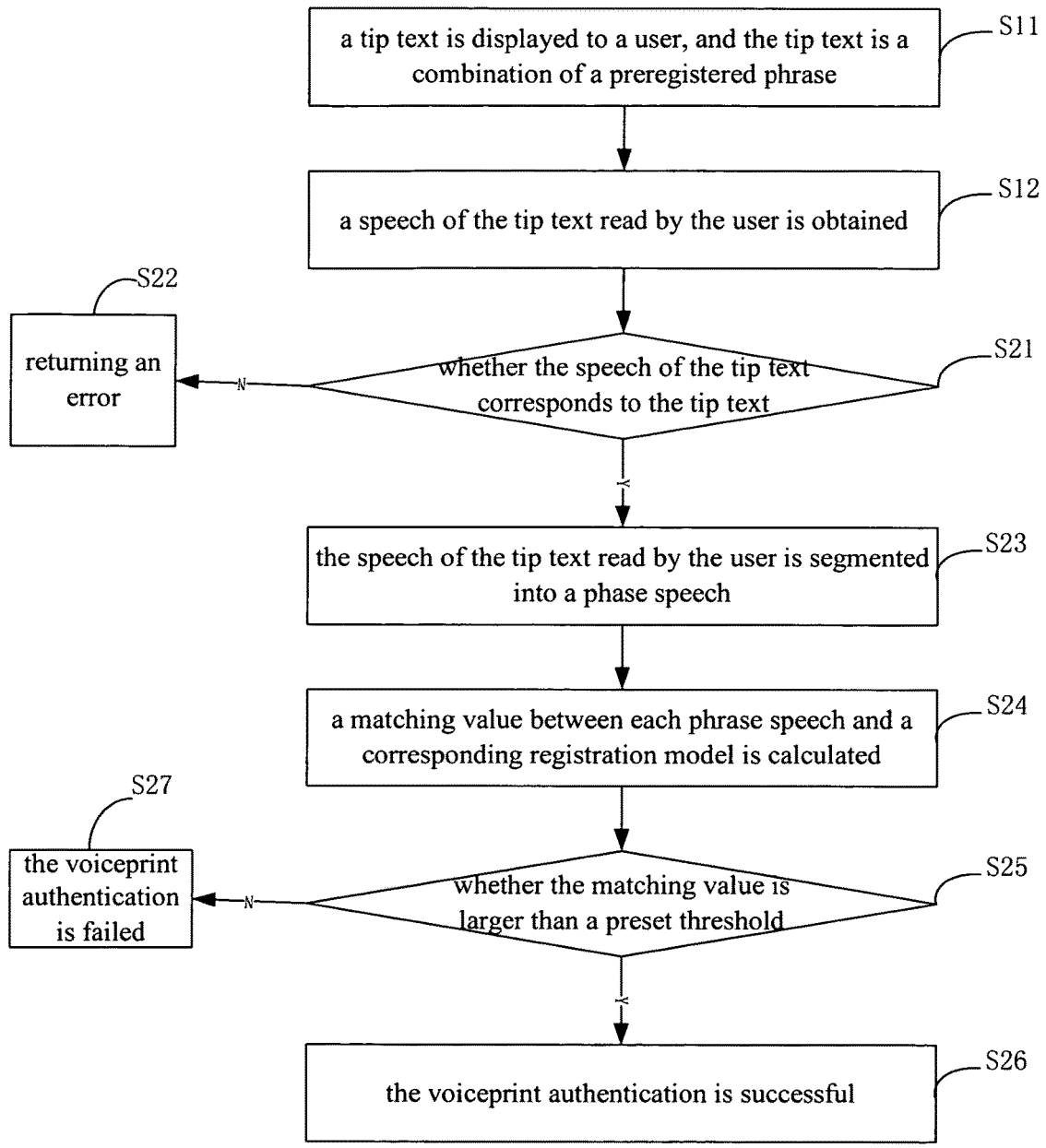
FIG. 2 is a flow chart showing a voiceprint authentication method according to another embodiment of the present disclosure.

For example, referring to FIG. 2, after obtaining the speech of the tip text, the method further includes the following steps.

In step S21, it is judged whether the speech of the tip text corresponds to the tip text.

Since the tip text is displayed to the user by the authentication apparatus, the tip text may be stored in the authentication apparatus.

In addition, after the authentication apparatus obtains the speech of the tip text, the text corresponding to this speech may be determined by the speech recognition technology. Then, this text may be compared with the stored tip text to judge whether they are consistent with each other.

In step S22, an error indicating that the speech of the tip text is not consistent with the tip text is returned if the speech of the tip text does not correspond to the tip text.

For example, by comparing the text corresponding to the speech with the stored tip text, a prompt indicating that the speech of the tip text is not consistent with the tip text is provided to the user and the user may read again, if the text corresponding to the speech is not consistent with the stored tip text.

If the text corresponding to the speech is consistent with the stored tip text, the result of the voiceprint authentication may be determined according to the speech and the pre-established registration model.

Alternatively, obtaining a pre-established registration model and determining a result of a voiceprint authentication according to the speech of the tip text and the pre-established registration model, includes:

segmenting the speech of the tip text into a phrase speech corresponding to the preregistered phrase, obtaining a first registration model pre-established and corresponding to the preregistered phrase, defining the phrase speech as a speech to be authenticated and the first registration model as an authentication model, and determining the result according to the speech to be authenticated and the authentication model; or obtaining a first registration model pre-established and corresponding to the preregistered phrase, combining the first registration model to obtain a combined registration model, defining the speech of the tip text as a speech to be authenticated and the combined registration model as an authentication model, and determining the result according to the speech to be authenticated and the authentication model; or obtaining a second registration model pre-established and corresponding to the tip text, defining the speech of the tip text as a speech to be authenticated and the second registration model as an authentication model, and determining the result according to the speech to be authenticated and the authentication model.

For example, if a speech of "anger Bull" is obtained, this speech may be segmented to obtain a speech of "anger" and a speech of "Bull". Then, the speech of "anger" may be matched with a speech corresponding to "anger" and stored during the registration; the speech of "Bull" may be matched with a speech corresponding to "Bull" and stored during the registration, so as to obtain the result of the voiceprint authentication. When segmenting the speech, a pre-established segmentation model may be adopted. This segmentation model may be established according to phrase speeches corresponding respectively to preregistered phrases, for example, the segmentation model records the start identification and the stop identification of each phrase speech during the registration, thus the speech may be segmented according to the start identification and the stop identification to obtain each phrase speech.

For another example, if it is determined that the current tip text is "anger Bull", a speech corresponding to "anger" and stored during the registration, and a speech corresponding to "Bull" and stored during the registration may be searched for in the registration information. Then, these two speeches may be combined to obtain a combined speech. Then, the combined speech is matched with the obtained speech of "anger Bull" read by the user to obtain the result of the voiceprint authentication.

For another example, during the registration, instead of establishing registration models of phases, the registration model of a possible tip text may be established. For example, the registration model corresponding to the speech of "anger Bull" may be established, and then during the authentication, the registration model corresponding to the speech of "anger Bull" may be obtained and matched with the obtained speech of "anger Bull" read by the user to obtain the result of the voiceprint authentication.

Referring to FIG. 2, take the speech segmentation as an example. If it is determined that the speech of the tip text corresponds to the tip text in step S21, the method further includes the following steps.

In step S23, the speech of the tip text read by the user is segmented into a phase speech.

When segmenting the speech, the pre-established segmentation model may be adopted. This segmentation model may be established according to the phrase speech corresponding to the preregistered phrase, for example, the segmentation model records the start identification and the stop identification of each phrase speech during the registration, thus the speech may be segmented according to the start identification and the stop identification to obtain the phrase speech.

In step S24, a matching value between each phrase speech and a corresponding registration model is calculated.

The method for calculating the matching value includes but is not limited to the ways of: scoring by using Viterbi algorithm with Hidden Markov Model (HMM), and scoring by using Probabilistic Linear Discriminant Analysis (PLDA) algorithm with ivector model.

In step S25, it is determined whether each matching value is larger than a preset threshold. If yes, step S26 is executed, otherwise, step S27 is executed.

In step S26, the voiceprint authentication is successful.

In step S27, the voiceprint authentication is failed.

Alternatively, obtaining a first registration model pre-established and corresponding to the preregistered phrase includes:

obtaining a user identification of the user; and obtaining the first registration model according to the user identification, the preregistered phrase and a correspondence of the user identification, the preregistered phrase and the first registration model generated during the registration.

For example, after segmenting the speech, the phrase speech of "angry" and the phrase speech of "Bull" are obtained.

During the registration, a correspondence may be generated: the correspondence of a user identification, a phrase and a registration model. For example, a first phrase of the first user is corresponding to a first registration model. When the user conducts the authentication, the user identification of the user may be obtained, and phrases may be obtained after segmenting a speech, then a corresponding registration model may be determined according to the correspondence.

After determining the registration model, the matching value between this registration model and the corresponding phrase speech may be calculated. The method for calculating the matching value includes but is not limited to the ways of: scoring using the Viterbi algorithm with HMM, scoring using the plda algorithm with ivector model.

The authentication is described above, and it should be understood that, the registration may be performed before the authentication. During the registration, the registration model of the phrase may be established.

Figure 3:
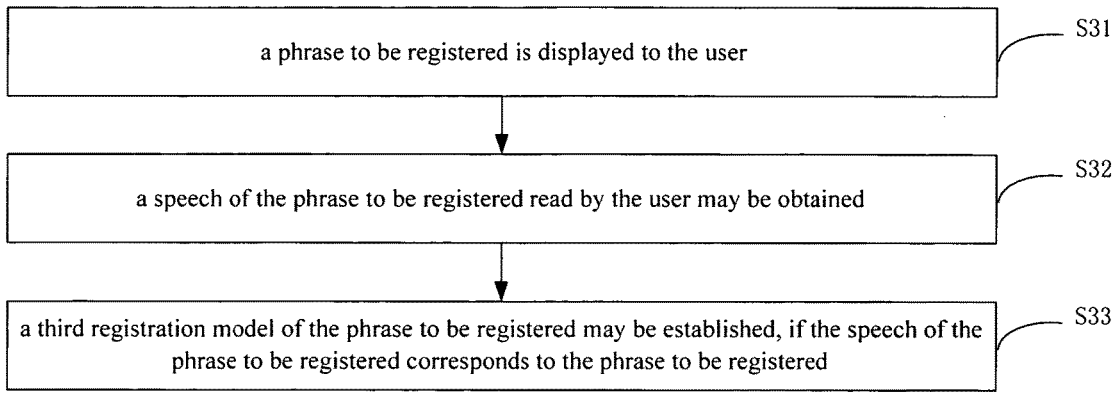
FIG. 3 is a flow chart showing a registration procedure according to an embodiment of the present disclosure.

Referring to FIG. 3, the registration procedure includes the following steps.

In step S31, a phrase to be registered is displayed to the user.

The phrase to be registered is generated in advance before the registration and the phrase to be registered includes the plurality of phrases to be registered.

Alternatively, if the phrase to be registered includes the plurality of phrases to be registered, the plurality of phrases to be registered satisfy at least one of conditions that:

a length of each of the plurality of phrases to be registered is less than a preset length threshold;

a difference between lengths of any two of the plurality of phrases to be registered is less than a preset difference; and one of the plurality of phrases to be registered does not contain a homophone of a word containing in another one of the plurality of phrases to be registered.

For example, the phrase to be registered is set to contain two or three words, so that the phrase is short text and basically with the consistent length.

For another example, one of the plurality of phrases to be registered does not contain a homophone of a word containing in another one of the plurality of phrases to be registered, for example, Chinese Pinyin for "Bull" is "gong-niu", which has the same pronunciation "gong" as "gong-shou", it is best to prevent the homophone "gong" from appearing in different phrases at the same time.

Figure 4:
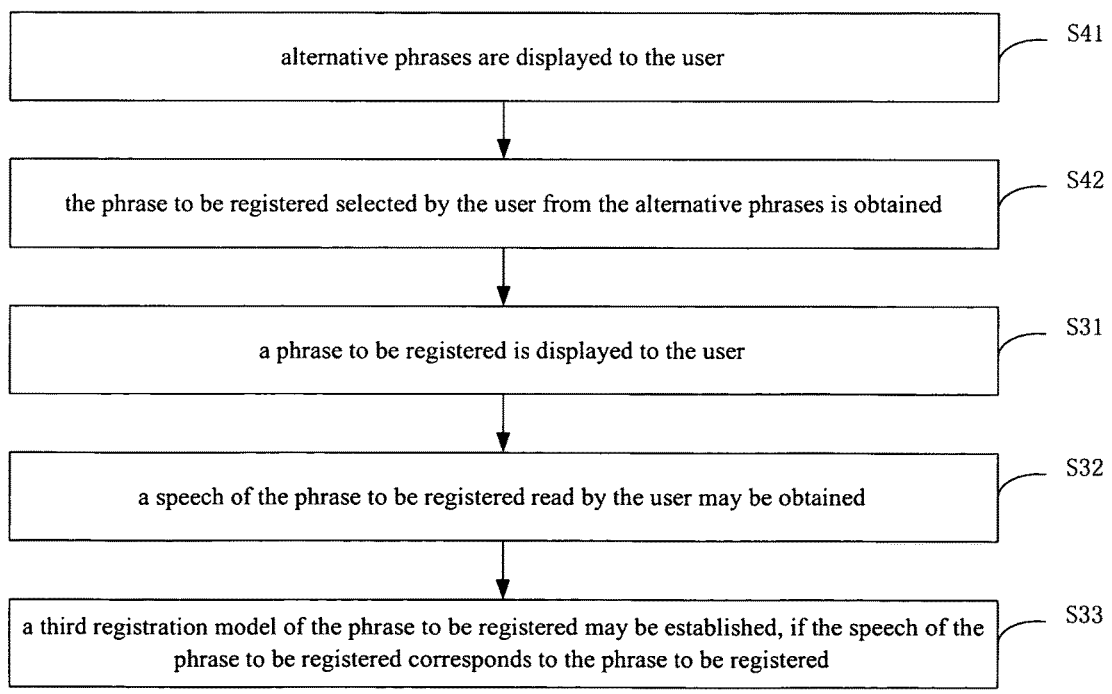
FIG. 4 is a flow chart showing a registration procedure according to another embodiment of the present disclosure.

Alternatively, the phrases to be registered may be set according to default settings, or may be selected by the user from multiple alternative phrases. For example, referring to FIG. 4, the registration procedure further includes the following steps.

In step S41, alternative phrases are displayed to the user.

Figure 5:
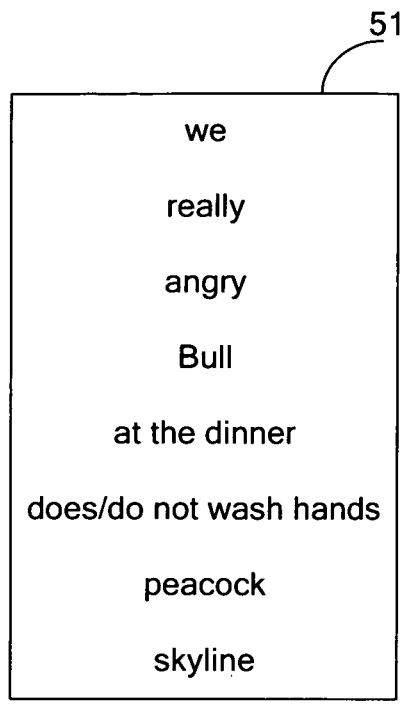
FIG. 5 is a schematic diagram illustrating alternative phrases during a registration procedure according to an embodiment of the present disclosure.

For example, referring to FIG. 5, the selection interface 51 is displayed, and this selection interface may display the alternative phrases, for example, "we", "really", "angry", . . . .

In step S42, the phrase to be registered selected by the user from the alternative phrases is obtained.

After phrases shown in FIG. 5 are displayed, the user may select the phrases to be registered from these phrases, for example, the phrases to be registered may include: "really", "angry", "does/do not wash hands" and "peacock". Then, after completing the registration of these phrases to be registered, a tip text may be generated during the authentication. For example, the tip text may include: "peacock does not wash hands," "angry peacock does not wash hands," or "angry peacock does not wash hands really" etc. It should be understood that, in this embodiment, take the combination of phases in logically as an example; however, in order to improve the readability, after combining the phrases to obtain a tip text, the grammar of the tip text may be checked. If the grammar of the tip text meets the requirement of the grammar, the tip text is displayed to the user.

Then, the phrase to be registered may be displayed to the user and the user may read the phrase to be registered.

In step S32, a speech of the phrase to be registered read by the user may be obtained.

For example, the user reads phrases to be registered in sequence, and corresponding speeches may be obtained by the speech obtaining module in the user's device.

In step S33, a third registration model of the phrase to be registered may be established, if the speech of the phrase to be registered corresponds to the phrase to be registered.

Alternatively, the speech of the phrase to be registered comprises a plurality of speeches of the phrase to be registered read by the user, and establishing a third registration model of the phrase to be registered if the speech of the phrase to be registered corresponds to the phrase to be registered comprises:

establishing the third registration model of the phrase to be registered according to the plurality of speeches of the phrase to be registered, if each of the plurality of speeches of the phrase to be registered corresponds to the phrase to be registered.

For example, when the user reads "really", it may be read for multiple times. After each reading, by the speech recognition technology, the corresponding text may be recognized. If the corresponding text is consistent with "really", the registration model corresponding to "really" may be established according to the plurality of speeches.

There may be many methods for establishing a registration model according to a speech, for example, the established registration model includes, but is not limited to: a voiceprint model based on HMM, a voiceprint model based on ivector model.

In the embodiment, the voiceprint authentication based on the limited text may be realized by comparing the speech and the registration model. Since the registration model is adopted, this method is equivalent to the voiceprint authentication technology unrelated to the text, thus the user needs not to speak for a long time during the authentication. In addition, since the tip text is the combination of the preregistered phase, this method is equivalent to the way of adopting the fixed registered phrase in the voiceprint authentication technology unrelated to the text, such that the content of speeches may be variable, and the fraud with sound recording may be avoided. In the embodiments of the present disclosure, the voiceprint authentication is adopted, which is not easy to imitate, improves the safety and increases the convenience. When being applied in payment, the user needs not to input a password and authenticate a message, thus improving the convenience and efficiency of the payment.

Figure 6:
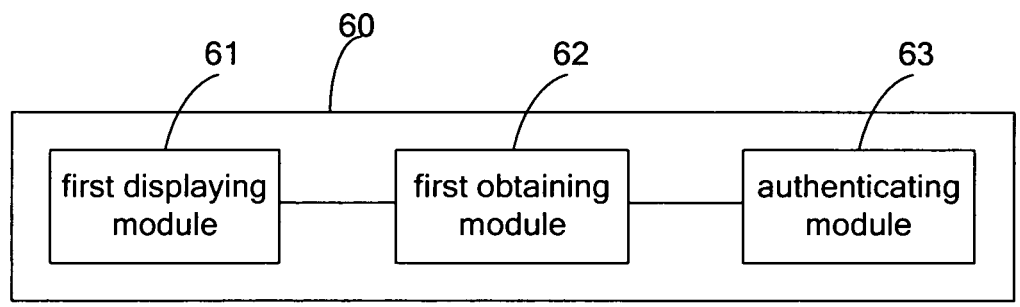
FIG. 6 is a block diagram if a voiceprint authentication apparatus according to another embodiment of the present disclosure.

FIG. 6 is a block diagram of a voiceprint authentication apparatus according to another embodiment of the present disclosure. The apparatus 60 includes a first displaying module 61, a first obtaining module 62 and an authenticating module 63.

The first displaying module 61 is configured to display a tip text to a user, and the text is a combination of a preregistered phrase.

If the user needs to conduct a voiceprint authentication, a user identification (i.e. a user ID, such as, a phone number, a login account, etc.) may be obtained firstly. Then, the registered phrase corresponding to the user identification, may be searched for in the registration information previously established.

For example, if the user is a first user, and the phrases registered by the first user in the registration information include A, B, C, etc., phrases selected from A, B, C may be combined to form the tip text.

When forming the tip text by combining the phrases selected from the registered phrases, the selection algorithm and the number of phrases selected may be configurable.

Figure 7:
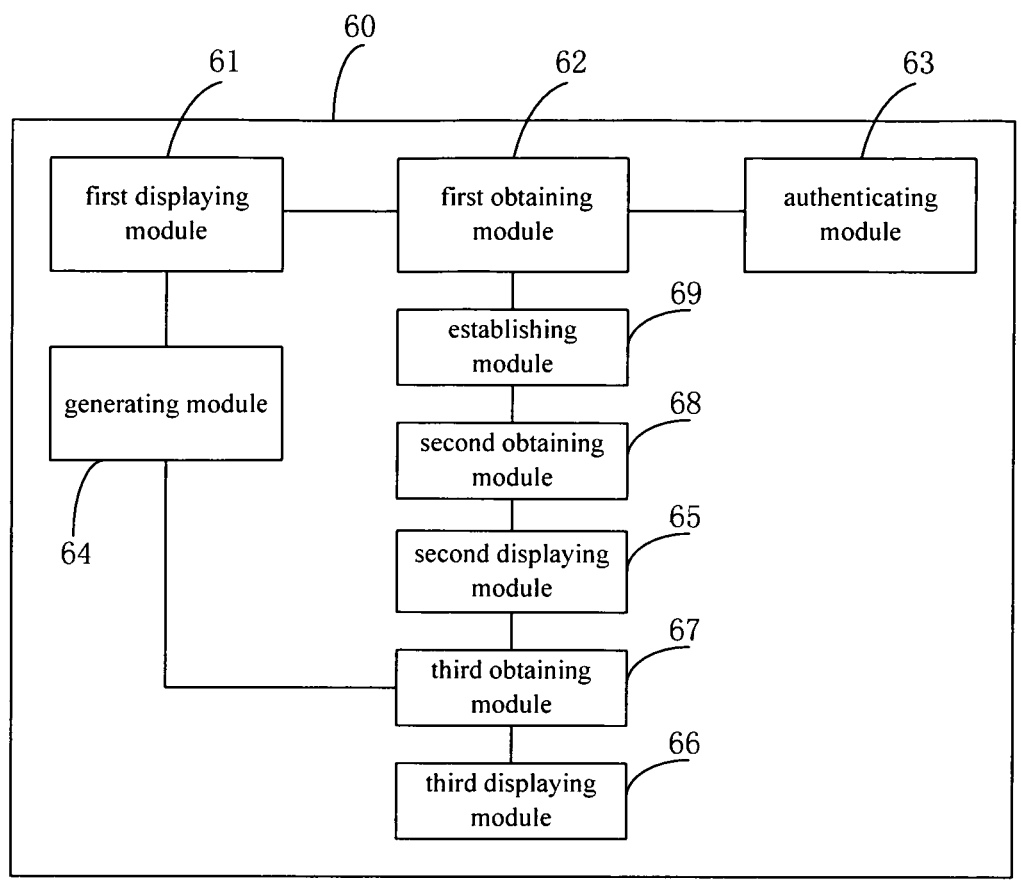
FIG. 7 is a block diagram of a voiceprint authentication apparatus according to another embodiment of the present disclosure.

Alternatively, the preregistered phrase includes a plurality of phrases, and referring to FIG. 7, the apparatus 60 further includes a generating module 64.

The generating module 64 is configured to select at least one phrase from the plurality of phrases and to combine the at least one phase, so as to form the tip text.

For example, the selection algorithm may be randomly selection algorithm, and two phrases are selected. It is assumed that the preregistered phrases include: "we", "really", "angry", "Bull", "at the diner" and "does/do not wash hands", then two phrases selected randomly from these six phrases may be combined to form the tip text, for example, the tip text may be "angry Bull", "does/do wash hands really", etc.

It should be understood that, the number of phrases selected for forming the tip text is not limited herein, which may be one or more. In addition, the number of the tip texts is also not limited herein, which may be one or more. Take an authentication procedure of a tip text as an example in subsequent embodiments. It should be understood that, if the tip text includes a plurality of tip texts, the authentication procedure of the plurality of tip texts may be accomplished according to the authentication procedure of a tip text, and if each of the plurality of tip texts is authenticated successfully, it is determined that the voiceprint authentication is successful, otherwise it is determined that the voiceprint authentication is failed.

The first obtaining module 62 is configured to obtain a speech of the tip text read by the user.

After displaying the tip text to the user, the user may read it.

The first obtaining module 62 may be a speech obtaining module, thus the speech of the tip text read by the user may be obtained.

The authenticating module 63 is configured to obtain a pre-established registration model and to determine a result of a voiceprint authentication according to the speech of the tip text and the pre-established registration model, if the speech of the tip text corresponds to the tip text.

Since the tip text is displayed to the user by the authentication apparatus, the tip text may be stored in the authentication apparatus.

In addition, after the authentication apparatus obtains the speech of the tip text, the text corresponding to this speech may be determined by the speech recognition technology. Then, this text may be compared with the stored tip text to judge whether they are consistent with each other.

If the speech of the tip text does not correspond to the tip text, an error indicating that the speech of the tip text is not consistent with the tip text is returned. For example, In addition, after the authentication apparatus obtains the speech of the tip text, the text corresponding to this speech may be determined by the speech recognition technology. Then, this text may be compared with the stored tip text to judge whether they are consistent with each other.

Alternatively, the authenticating module 63 is specifically configured to:

segment the speech of the tip text into a phrase speech corresponding to the preregistered phrase, obtain a first registration model which pre-established and corresponding to the preregistered phrase, define the phrase speech as a speech to be authenticated and the first registration model as an authentication model, and determine the result according to the speech to be authenticated and the authentication model; or obtain a first registration model pre-established and corresponding to the preregistered phrase, combine the first registration model to obtain a combined registration model, define the speech of the tip text as a speech to be authenticated and the combined registration model as an authentication model, and determine the result according to the speech to be authenticated and the authentication model; or obtain a second registration model pre-established and corresponding to the tip text, define the speech of the tip text as a speech to be authenticated and the second registration model as an authentication model, and determine the result according to the speech to be authenticated and the authentication model.

For example, if a speech of "anger Bull" is obtained, this speech may be segmented to obtain a speech of "anger" and a speech of "Bull". Then, the speech of "anger" may be matched with a speech corresponding to "anger" and stored during the registration; the speech of "Bull" may be matched with a speech corresponding to "Bull" and stored during the registration, so as to obtain the result of the voiceprint authentication. When segmenting the speech, a pre-established segmentation model may be adopted. This segmentation model may be established according to phrase speeches corresponding respectively to preregistered phrases, for example, the segmentation model records the start identification and the stop identification of each phrase speech during the registration, thus the speech may be segmented according to the start identification and the stop identification to obtain each phrase speech.

For another example, if it is determined that the current tip text is "anger Bull", a speech corresponding to "anger" and a speech corresponding to "Bull" may be searched for in the registration information. Then, these two speeches may be combined to obtain a combined speech. Then, the combined speech is matched with the obtained speech of "anger Bull" read by the user to obtain the result of the voiceprint authentication.

For another example, during the registration, instead of establishing registration models of phases, the registration model of a possible tip text may be established. For example, the registration model corresponding to the speech of "anger Bull" may be established, and then during the authentication, the registration model corresponding to the speech of "anger Bull" may be obtained and matched with the obtained speech of "anger Bull" read by the user to obtain the result of the voiceprint authentication.

Alternatively, the authenticating module 63 is configured to determine the result according to the speech to be authenticated and the authentication model by calculating a matching value between the speech to be authenticated and the authentication model; and determining that the voiceprint authentication is successful if the matching value is larger than a preset threshold.

Alternatively, the authenticating module 63 is configured to obtain a first registration model pre-established and corresponding to the preregistered phrase by obtaining a user identification of the user; and obtaining the first registration model according to the user identification, the preregistered phrase and a correspondence of the user identification, the preregistered phrase and the first registration model.

For example, after segmenting the speech, the phrase speech of "angry" and the phrase speech of "Bull" are obtained.

During the registration, a correspondence may be generated: the correspondence of a user identification, a phrase and a registration model. For example, a first phrase of the first user is corresponding to a first registration model. When the user conducts the authentication, the user identification of the user may be obtained, and phrases may be obtained after segmenting a speech, then a corresponding registration model may be determined according to the correspondence.

After determining the registration model, the matching value between this registration model and the corresponding phrase speech may be calculated. The method for calculating the matching value includes but is not limited to the ways of scoring using the Viterbi algorithm with HMM, scoring using the plda algorithm with ivector model.

In another embodiment, referring to FIG. 7, the apparatus 60 further includes a second displaying module 65.

The second displaying module 65 is configured to display a phrase to be registered to the user.

The phrase to be registered is generated in advance before the registration and the phrase to be registered includes the plurality of phrases to be registered.

Alternatively, if the phrase to be registered includes the plurality of phrases to be registered, the plurality of phrases to be registered satisfy at least one of conditions that:

a length of each of the plurality of phrases to be registered is less than a preset length threshold;

a difference between lengths of any two of the plurality of phrases to be registered is less than a preset difference; and one of the plurality of phrases to be registered does not contain a homophone of a word containing in another one of the plurality of phrases to be registered.

For example, the phrase to be registered is set to contain two or three words, so that the phrase is short text and basically with the consistent length.

For another example, one of the plurality of phrases to be registered does not contain a homophone of a word containing in another one of the plurality of phrases to be registered, for example, Chinese Pinyin for "Bull" is "gong-niu", which has the same pronunciation "gong" as "gong-shou", it is best to prevent the homophone "gong" from appearing in different phrases at the same time.

In another embodiment, referring to FIG. 7, the apparatus 60 further includes a third displaying module 66, a third obtaining module 67, a second obtaining module 68 and an establishing module 69.

The third displaying module 66 is configured to display alternative phrases to the user.

For example, referring to FIG. 5, the selection interface 51 is displayed, and this selection interface may display the alternative phrases, for example, "we", "really", "angry", . . . .

The third obtaining module 67 is configured to obtain the phrase to be registered selected by the user from the alternative phrases.

After phrases shown in FIG. 5 are displayed, the user may select the phrases to be registered from these phrases, for example, the phrases to be registered may include: "really", "angry", "does/do not wash hands" and "peacock". Then, after completing the registration of these phrases to be registered, a tip text may be generated during the authentication. For example, the tip text may include: "peacock does not wash hands," "angry peacock does not wash hands," or "angry peacock does not wash hands really", etc. It should be understood that, in this embodiment, take the combination of phases in logically as an example; however, in order to improve the readability, after combining the phrases to obtain a tip text, the grammar of the tip text may be checked.

If the grammar of the tip text meets the requirement of the grammar, the tip text is displayed to the user.

Then, the phrase to be registered may be displayed to the user and the user may read the phrase to be registered.

The second obtaining module 68 is configured to obtain a speech of the phrase to be registered read by the user;

For example, the user reads phrases to be registered in sequence, and corresponding speeches may be obtained by the speech obtaining module in the user's device.

The establishing module 69 is configured to establish a third registration model of the phrase to be registered, if the speech of the phrase to be registered corresponds to the phrase to be registered.

Alternatively, the speech of the phrase to be registered comprises a plurality of speeches of the phrase to be registered read by the user, and the establishing module 69 is specifically configured to establish the third registration model of the phrase to be registered according to the plurality of speeches of the phrase to be registered, if each of the plurality of speeches of the phrase to be registered corresponds to the phrase to be registered.

For example, when the user reads "really", it may be read for multiple times. After each reading, by the speech recognition technology, the corresponding text may be recognized. If the corresponding text is consistent with "really", the registration model corresponding to the "really" may be established according to the plurality of speeches.

There may be many methods for establishing a registration model according to a speech, for example, the established registration model includes, but is not limited to: a voiceprint model based on HMM, a voiceprint model based on ivector model.

In the embodiment, the voiceprint authentication based on the limited text may be realized by comparing the speech and the registration model. Since the registration model is adopted, this authentication method in the apparatus is equivalent to the voiceprint authentication technology unrelated to the text, thus the user needs not to speak for a long time during the authentication. In addition, since the tip text is the combination of the preregistered phase, this method is equivalent to the way of adopting the fixed registered phrase in the voiceprint authentication technology unrelated to the text, such that the content of speeches may be variable, and the fraud with sound recording may be avoided. In the embodiments of the present disclosure, the voiceprint authentication is adopted, which is not easy to imitate, improves the safety and increases the convenience. When being applied in payment, the user needs not to input a password and authenticate a message, thus improving the convenience and efficiency of the payment.

Combination of Features

Features described above as well as those claimed below may be combined in various ways without departing from the scope hereof. The following examples illustrate possible, non-limiting combinations the present invention has been described above, it should be clear that many changes and modifications may be made to the process and product without departing from the spirit and scope of this invention:

(a) A voiceprint authentication method, comprising:

displaying a tip text to a user, wherein the tip text is a combination of a preregistered phrase;

obtaining a speech of the tip text read by the user; and obtaining a pre-established registration model and determining a result of a voiceprint authentication according to the speech of the tip text and the pre-established registration model, if the speech of the tip text corresponds to the tip text.

(b) In the method denoted as (a), the step of obtaining a pre-established registration model and determining a result of a voiceprint authentication according to the speech of the tip text and the pre-established registration model, comprising:

segmenting the speech of the tip text into a phrase speech corresponding to the preregistered phrase, obtaining a first registration model pre-established and corresponding to the preregistered phrase, defining the phrase speech as a speech to be authenticated and the first registration model as an authentication model, and determining the result according to the speech to be authenticated and the authentication model; or obtaining a first registration model pre-established and corresponding to the preregistered phrase, combining the first registration model to obtain a combined registration model, defining the speech of the tip text as a speech to be authenticated and the combined registration model as an authentication model, and determining the result according to the speech to be authenticated and the authentication model; or obtaining a second registration model pre-established and corresponding to the tip text, defining the speech of the tip text as a speech to be authenticated and the second registration model as an authentication model, and determining the result according to the speech to be authenticated and the authentication model.

(c) In the method denoted as (a), in which the preregistered phrase comprises a plurality of phrases, and before displaying a tip text to a user, the method further comprises:

selecting at least one phrase from the plurality of phrases and combining the at least one phase to form the tip text.

(d) In the method denoted as (b), in which determining the result according to the speech to be authenticated and the authentication model comprises:

calculating a matching value between the speech to be authenticated and the authentication model; and determining that the voiceprint authentication is successful if the matching value is larger than a preset threshold.

(e) In the method denoted as (b), in which obtaining a first registration model pre-established and corresponding to the preregistered phrase comprises:

obtaining a user identification of the user; and obtaining the first registration model according to the user identification, the preregistered phrase, and a correspondence of the user identification, the preregistered phrase and the first registration model.

(f) In any of the methods denoted as (a)-(e), further comprising:

displaying a phrase to be registered to the user;

obtaining a speech of the phrase to be registered read by the user; and establishing a third registration model of the phrase to be registered, if the speech of the phrase to be registered corresponds to the phrase to be registered.

(g) In the method denoted as (f), in which the speech of the phrase to be registered comprises a plurality of speeches of the phrase to be registered read by the user, and establishing a third registration model of the phrase to be registered if the speech of the phrase to be registered corresponds to the phrase to be registered comprises:

establishing the third registration model of the phrase to be registered according to the plurality of speeches of the phrase to be registered, if each of the plurality of speeches of the phrase to be registered corresponds to the phrase to be registered.

(h) In the method denoted as (f), further comprising:
displaying alternative phrases to the user; and
obtaining the phrase to be registered selected by the user from the alternative phrases.

(i) In the method denoted as (f), in which the phrase to be registered comprises a plurality of phrases to be registered, and the plurality of phrases to be registered satisfy at least one of conditions that:
a length of each of the plurality of phrases to be registered is less than a preset length threshold;
a difference between lengths of any two of the plurality of phrases to be registered is less than a preset difference; and
one of the plurality of phrases to be registered does not contain a homophone of a word containing in another one of the plurality of phrases to be registered.

(j) A voiceprint authentication apparatus, comprising:
a first displaying module, configured to display a tip text to a user, wherein the tip text is a combination of a preregistered phrase;
a first obtaining module, configured to obtain a speech of the tip text read by the user; and
an authenticating module, configured to obtain a pre-established registration model and to determine a result of a voiceprint authentication according to the speech of the tip text and the pre-established registration model, if the speech of the tip text corresponds to the tip text.

(k) In the apparatus denoted as (j), in which the authenticating module is specifically configured to:
segment the speech of the tip text into a phrase speech corresponding to the preregistered phrase, obtain a first registration model pre-established and corresponding to the preregistered phrase, define the phrase speech as a speech to be authenticated and the first registration model as an authentication model, and determine the result according to the speech to be authenticated and the authentication model; or
obtain a first registration model pre-established and corresponding to the preregistered phrase, combine the first registration model to obtain a combined registration model, define the speech of the tip text as a speech to be authenticated and the combined registration model as an authentication model, and determine the result according to the speech to be authenticated and the authentication model; or
obtain a second registration model pre-established and corresponding to the tip text, define the speech of the tip text as a speech to be authenticated and the second registration model as an authentication model, and determine the result according to the speech to be authenticated and the authentication model.

(l) In the apparatus denoted as (j), in which the preregistered phrase comprises a plurality of phrases, and before displaying a tip text to a user, the apparatus further comprises:
a generating module, configured to select at least one phrase from the plurality of phrases and to combine the at least one phase to form the tip text.

(m) In the apparatus denoted as (k), in which the authenticating module is configured to determine the result according to the speech to be authenticated and the authentication model by
calculating a matching value between the speech to be authenticated and the authentication model; and
determining that the voiceprint authentication is successful if the matching value is larger than a preset threshold.

(n) In the apparatus denoted as (k), in which the authenticating module is configured to obtain a first registration model pre-established and corresponding to the preregistered phrase by
obtaining a user identification of the user; and
obtaining the first registration model according to the user identification, the preregistered phrase and a correspondence of the user identification, the preregistered phrase and the first registration model.

(o) In any of the apparatuses denoted as (j)-(n), further comprising:
a second displaying module, configured to display a phrase to be registered to the user;
a second obtaining module, configured to obtain a speech of the phrase to be registered read by the user; and
an establishing module, configured to establish a third registration model of the phrase to be registered, if the speech of the phrase to be registered corresponds to the phrase to be registered.

(p) In the apparatus denoted as (o), in which the speech of the phrase to be registered comprises a plurality of speeches of the phrase to be registered read by the user, and the establishing module is specifically configured to:
establish the third registration model of the phrase to be registered according to the plurality of speeches of the phrase to be registered, if each of the plurality of speeches of the phrase to be registered corresponds to the phrase to be registered.

(q) In the apparatus denoted as (o), further comprising:
a third displaying module, configured to display alternative phrases to the user; and
a third obtaining module, configured to obtain the phrase to be registered selected by the user from the alternative phrases.

(r) A storage medium for storing an application program which is configured to execute the voiceprint authentication method denoted as (a)-(i).

In the description of the present disclosure, it should be understood that, terms such as "first" and "second" are used herein for purposes of description and are not intended to indicate or imply relative importance or significance. In addition, in the description of the present disclosure, the term "a plurality of" means two or more.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A voiceprint authentication method, comprising:
   obtaining a user identification of a user and displaying a tip text to the user, wherein the tip text is formed by, for each time the voiceprint is to be authenticated, randomly selecting at least one phrase from a plurality of preregistered phrases which are obtained according to registration information and the user identification, wherein the user identification is selected from a group including a phone number, and a login account;
   obtaining, by a microphone, a speech of the tip text read by the user; and
   obtaining a pre-established registration model according to the user identification, the at least one phrase and the registration information; and determining a result of a voiceprint authentication according to the speech of the tip text and the pre-established registration model, if the speech of the tip text corresponds to the tip text; the registration information comprising correspondence between user identifications, pre-established registration models and the plurality of preregistered phrases; the pre-established registration models comprising a hidden markov model and an ivector model;
   wherein the method further comprises:
   displaying a phrase to be registered to the user;
   obtaining, by a microphone, a speech of the phrase to be registered read by the user; and
   establishing a third registration model of the phrase to be registered, if the speech of the phrase to be registered corresponds to the phrase to be registered;
   wherein the phrase to be registered comprises a plurality of phrases to be registered, and the plurality of phrases to be registered satisfy at least one of conditions that:
   a difference between lengths of any two of the plurality of phrases to be registered is less than a preset difference; and
   one of the plurality of phrases to be registered does not contain a homophone of a word contained in another one of the plurality of phrases to be registered.

2. The method according to claim 1, wherein, obtaining a pre-established registration model and determining a result of a voiceprint authentication according to the speech of the tip text and the pre-established registration model, comprises:
   segmenting the speech of the tip text into a phrase speech corresponding to the preregistered phrase, obtaining a first registration model pre-established and corresponding to the preregistered phrase, defining the phrase speech as a speech to be authenticated and the first registration model as an authentication model, and determining the result according to the speech to be authenticated and the authentication model.

3. The method according to claim 1, wherein, obtaining a pre-established registration model and determining a result of a voiceprint authentication according to the speech of the tip text and the pre-established registration model, comprises:
   obtaining a first registration model pre-established and corresponding to the preregistered phrase, combining the first registration model to obtain a combined registration model, defining the speech of the tip text as a speech to be authenticated and the combined registration model as an authentication model, and determining the result according to the speech to be authenticated and the authentication model.

4. The method according to claim 2, wherein determining the result according to the speech to be authenticated and the authentication model comprises:
   calculating a matching value between the speech to be authenticated and the authentication model; and
   determining that the voiceprint authentication is successful if the matching value is larger than a preset threshold.

5. The method according to claim 1, wherein the speech of the phrase to be registered comprises a plurality of speeches of the phrase to be registered read by the user, and establishing a third registration model of the phrase to be registered if the speech of the phrase to be registered corresponds to the phrase to be registered comprises:
   establishing the third registration model of the phrase to be registered according to the plurality of speeches of the phrase to be registered, if each of the plurality of speeches of the phrase to be registered corresponds to the phrase to be registered.

6. The method according to claim 1, further comprising:
   displaying alternative phrases to the user; and
   obtaining the phrase to be registered selected by the user from the alternative phrases.

7. A voiceprint authentication apparatus, comprising:
   a processor; and
   a memory for storing instructions executable by the processor, wherein the processor is configured to:

obtain a user identification of a user and display a tip text to the user, wherein the tip text is formed by, for each time the voiceprint is to be authenticated, randomly selecting at least one phrase from a plurality of preregistered phrases which are obtained according to registration information and the user identification, wherein the user identification is selected from a group including a phone number;

obtain a speech of the tip text read by the user; and obtain a pre-established registration model according to the user identification, the at least one phrase and the registration information and to determine a result of a voiceprint authentication according to the speech of the tip text and the pre-established registration model, if the speech of the tip text corresponds to the tip text; the registration information comprising correspondence between user identifications, pre-established registration models and the plurality of preregistered phrases; the pre-established registration models comprising a hidden markov model and an ivector model;

wherein the processor is further configured to:

display a phrase to be registered to the user;

obtain a speech of the phrase to be registered read by the user; and establish a third registration model of the phrase to be registered, if the speech of the phrase to be registered corresponds to the phrase to be registered;

wherein the phrase to be registered comprises a plurality of phrases to be registered, and the plurality of phrases to be registered satisfy at least one of conditions that:

a difference between lengths of any two of the plurality of phrases to be registered is less than a preset difference; and one of the plurality of phrases to be registered does not contain a homophone of a word containing in another one of the plurality of phrases to be registered.

8. The apparatus according to claim 7, wherein the processor is configured to obtain a pre-established registration model and determining a result of a voiceprint authentication according to the speech of the tip text and the pre-established registration model by:

segmenting the speech of the tip text into a phrase speech corresponding to the preregistered phrase, obtaining a first registration model pre-established and corresponding to the preregistered phrase, defining the phrase speech as a speech to be authenticated and the first registration model as an authentication model, and determining the result according to the speech to be authenticated and the authentication model.

9. The apparatus according to claim 7, wherein the processor is configured to obtain a pre-established registration model and determining a result of a voiceprint authentication according to the speech of the tip text and the pre-established registration model by:

obtaining a first registration model pre-established and corresponding to the preregistered phrase, combining the first registration model to obtain a combined registration model, defining the speech of the tip text as a speech to be authenticated and the combined registration model as an authentication model, and determining the result according to the speech to be authenticated and the authentication model.

10. The apparatus according to claim 8, wherein the processor is configured to determine the result according to the speech to be authenticated and the authentication model by calculating a matching value between the speech to be authenticated and the authentication model; and determining that the voiceprint authentication is successful if the matching value is larger than a preset threshold.

11. A non-transitory storage medium for storing an application program which is configured to execute the voiceprint authentication method, wherein the method comprises:

obtaining a user identification of a user and displaying a tip text to the user, wherein the tip text is formed by, for each time the voiceprint is to be authenticated, randomly selecting at least one phrase from a plurality of preregistered phrases which are obtained according to registration information and the user identification, wherein the user identification is selected from a group including a phone number;

obtaining a speech of the tip text read by the user; and obtaining a pre-established registration model according to the user identification, the at least one phrase and the registration information; and determining a result of a voiceprint authentication according to the speech of the tip text and the pre-established registration model, if the speech of the tip text corresponds to the tip text; the registration information comprising correspondence between user identifications, pre-established registration models and the plurality of preregistered phrases; the pre-established registration models comprising a hidden markov model and an ivector model;

wherein the method further comprises:

displaying a phrase to be registered to the user;

obtaining a speech of the phrase to be registered read by the user; and establishing a third registration model of the phrase to be registered, if the speech of the phrase to be registered corresponds to the phrase to be registered;

wherein the phrase to be registered comprises a plurality of phrases to be registered, and the plurality of phrases to be registered satisfy at least one of conditions that:

a difference between lengths of any two of the plurality of phrases to be registered is less than a preset difference; and one of the plurality of phrases to be registered does not contain a homophone of a word containing in another one of the plurality of phrases to be registered.

* * * * *